Oct. 6, 1970          W. C. WARE          3,532,268
ADJUSTABLE GAS PRESSURE CONTROL SYSTEM
Filed July 12, 1967          2 Sheets-Sheet 2
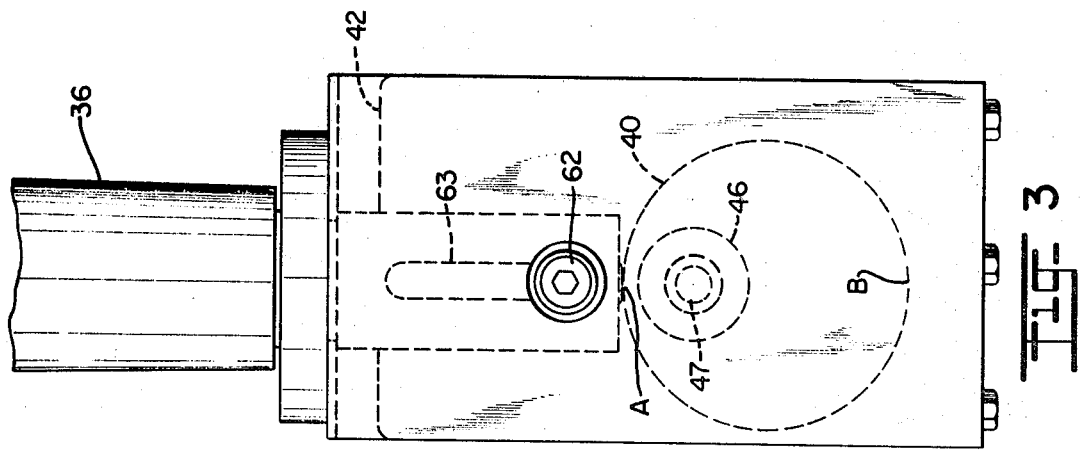
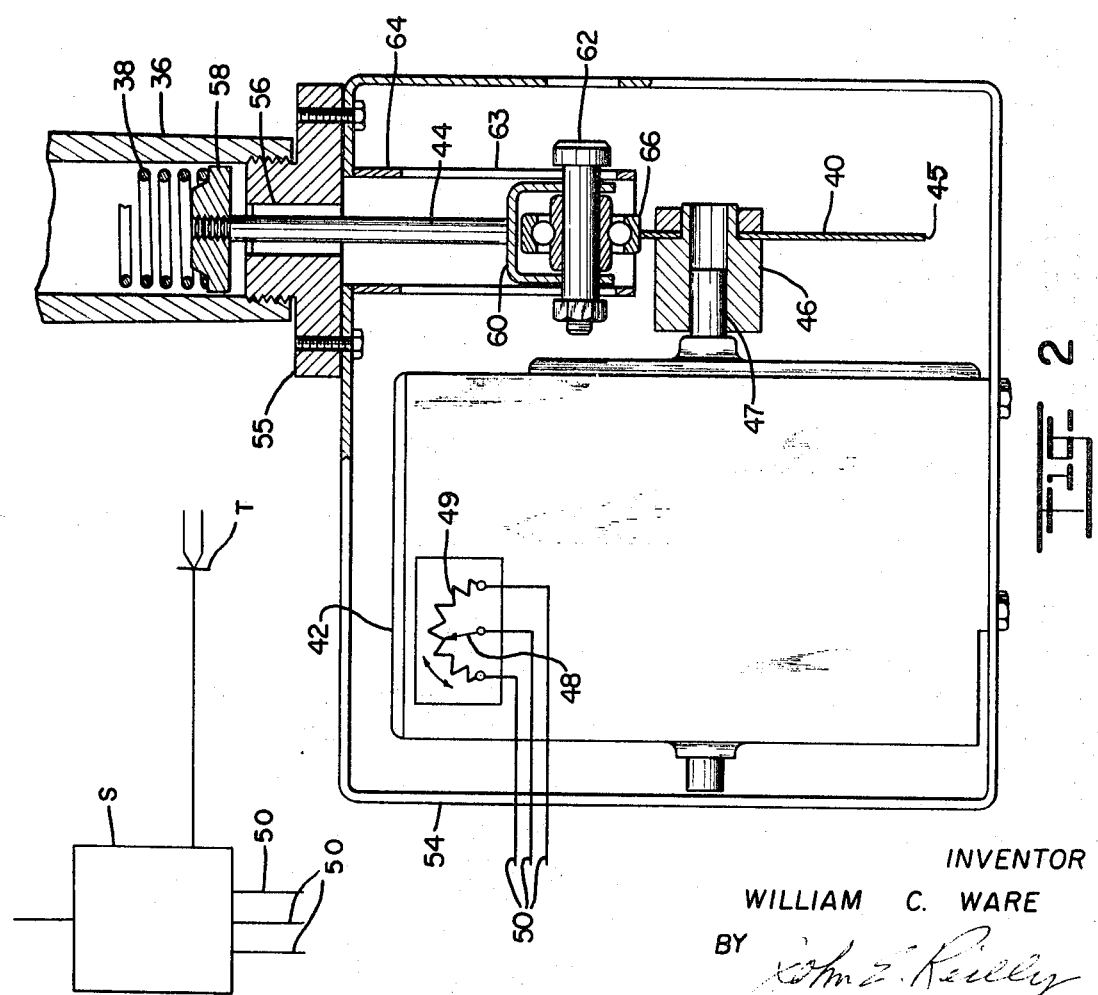
INVENTOR
WILLIAM C. WARE
BY
ATTORNEY > # United States Patent Office

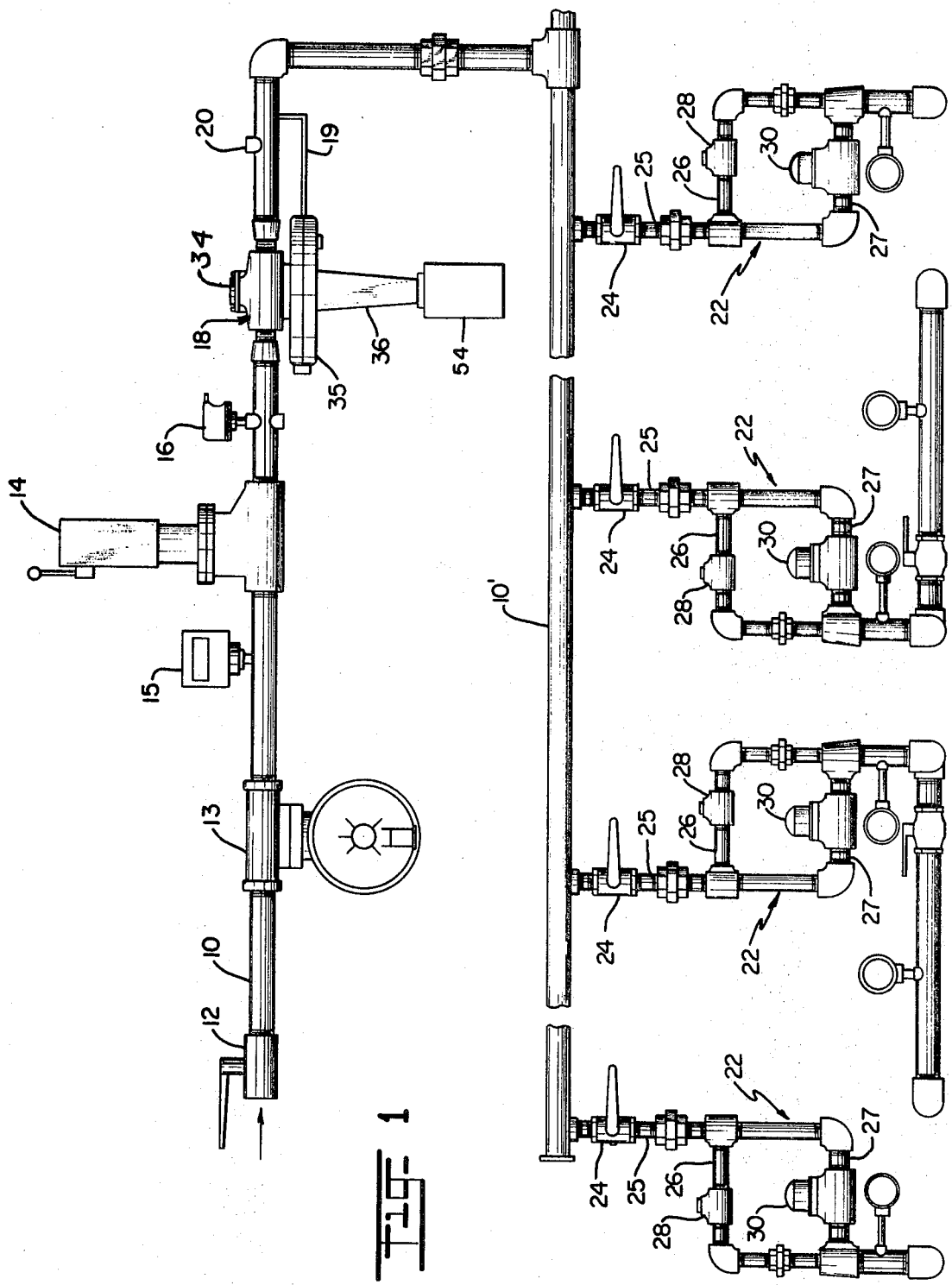

3,532,268
Patented Oct. 6, 1970

3,532,268
ADJUSTABLE GAS PRESSURE CONTROL SYSTEM
William C. Ware, Denver, Colo., assignor, by mesne assignments, to DFC Corporation, Denver, Colo., a corporation of Colorado
Filed July 12, 1967, Ser. No. 652,781
Int. Cl. F23n 5/20
U.S. Cl. 236—15
7 Claims

ABSTRACT OF THE DISCLOSURE

In order to bring about uniform, closely controlled heating of a multizone furnace, the gas pressure level in the supply line to the burners for each zone is programmed by a cam-controlled pressure regulator to undergo variations in pressure in direct relation to variations in the desired temperature level in the furnace throughout its firing cycle; and the same may be accomplished either independently of or in correlation with variations in the volume rate of gas supplied to each burner or zone of the furnace.

---

This invention relates to a novel and improved method and means for regulating the gas supply pressure; and more particularly relates to a programmed gas pressure controller being especially adaptable for use as part of a temperature control system in regulating the heat input to multizone furnaces, kilns and the like.

Customarily, a kiln or furnace is raised to the desired temperature level in accordance with a preselected time-temperature curve or firing cycle. In multizone kilns and furnaces, the usual procedure is to successively scan the temperature in each zone and to compare with the desired or "set-point" temperature at regular time intervals throughout the cycle. Where a temperature difference or mismatch occurs between the temperature sensed and the set-point temperature, correction is made by transmitting a signal to a control valve in the burner supply line for each zone whereby to vary the rate of gas flow to the burner and impose a corresponding variation in the heat input at each respective zone.

In conventional temperature control apparatus, if the gas supply pressure is fixed throughout the firing cycle, it is often difficult to respond accurately to a given temperature change simply by regulating the gas flow, since the heat input is dependent upon the gas pressure level as well as flow capacity. For instance, if a maximum fixed gas pressure is selected for a firing cycle, representing the optimum pressure condition at the highest temperature in the cycle, at lower temperature the gas pressure being relatively high tends to bring about an over-correction or a very sudden change in heat input for a given correction at the control valve; and, in general, the percentage increase in heat input, for a given increase in gas volume, will not be consistent at different temperature levels, if the gas pressure is fixed. It is therefore highly desirable to impose controlled variations on the gas pressure to establish optimum pressure levels throughout the heating cycle, and to do so in such a way that the gas pressure can be automatically regulated in direct relation to changes in the set-point temperature level. Accordingly, variations in heat input necessary to bring about desired temperature changes will be influenced both by the correction signals applied to control the volume rate of gas flow to each zone and by automatic regulation of the gas pressure level. As a result, it is possible to achieve more uniform, close control both over the temperature change and rate of temperature change in direct conformity with the firing cycle selected.

It is therefore a principal and foremost object of the present invention to provide in temperature control apparatus for furnaces, kilns and the like for a direct, accurate means of controlling heat input both with respect to time and temperature changes desired over extended temperature ranges.

It is another obect of the present invention to provide a novel and improved method and means for programming a gas pressure regulator to obtain optimum pressure levels and variations in pressure levels for given temperature changes and for selected time rate of temperature changes over extremely wide ranges in temperature; further to accomplish the same either independently of or in direct relation to imposed variations in volume rate of gas flow.

It is a further object of the present invention to provide a novel and improved means of programming a gas pressure regulator in a main gas supply line feeding one or more burners in a multizone furnace or kiln whereby to establish optimum pressure levels for given temperature changes and a specified time rate of change all in accordance with a selected firing cycle or program for the furnace or kiln.

The above and other objects, advantages and features of the present invention will become more readily appreciated and understood from a consideration of the following detailed description of a preferred embodiment of the present invention when taken together with the accompanying drawings, in which:

FIG. 1 is a system diagram of a pressure regulator disposed in a gas supply line for a series of gas burners arranged in parallel for heating a multizone kiln.

FIG. 2 is a fragmentary view partially in section of a preferred form of programming device for a gas pressure regulator in accordance with the present invention; and FIG. 3 is an end view of the device shown in FIG. 2.

Referring in more detail to the drawings, there is shown by way of illustrative example in FIG. 1 a gas-fired heating system for a ceramic kiln, not shown, the heating system being made up of a main gas supply line 10 leading from a suitable source of gas supply with a gas shut-off valve 12 at the inlet together with a pressure regulator 13 to reduce the supply pressure to the desired working pressure for the system. Further, in accord with conventional practice, a gas valve represented at 14 is controlled by high and low gas pressure switches 15 and 16 located on opposite sides of the valve and directly ahead of a second pressure regulator 18. As illustrated, the gas valve 14 is a manual reset, safety shut-off valve, controlled by the switches 15 and 16, to automatically close if the pressure becomes either too high or too low with respect to that required for proper functioning of the heating system. The pressure regulator 18 is provided with a suitable bleed line 19 from the diaphragm sections 35 into the main supply line; and a relief vent 20 is positioned downstream of the pressure regulator.

The main supply line leads into a header or manifold 10' for a series of auxiliary lines for burner sections, the sections being connected in parallel to the header 10' and being correspondingly designed and therefore correspondingly represented in the drawings at 22. It will be evident that any number of auxiliary lines may be arranged in parallel to receive gas supplied through the main supply line to the header depending on the heating requirements and size of the kiln, and where each burner section is located at a different station or zone of the kiln. Specifically each burner section 22 includes a burner element, not shown, which for example may be of the type described and set forth in copending application for patent, Ser. No. 639,920, filed Apr. 24, 1967, and assigned to the assignee of this invention. Each burner section also includes a supply cock 24 in the line 25 from the header into parallel lines 26 and 27, the line 26 having a limiting orifice gas valve 28 positioned therein and the line 27 including a temperature controlled solenoid valve 30. The limiting orifice 28 is adjustable and may be preset to pass a specified minimum volume of gas at all times; and preferably the solenoid valve 30 is a normally closed valve being energized in response to signals applied by suitable temperature control apparatus to open and admit more gas to the burner in order to increase the heat input for each zone.

Various temperature control apparatus are commercially available and are designed to sustain the operating temperatures desired in a furnace or kiln in accordance with a preselected firing cycle for the material heated therein. Representative of such temperature control apparatus is the Control Temperature Scanner manufactured and sold by West Instrument Corporation and described in Bulletin SC dated July 1966, and is represented at 5 in FIG. 2. The scanner is equipped with a program controller in the form of a motor-driven program cam provided with "time lines" corresponding to different stages of the firing cycle or time-temperature curve selected. A time-temperature chart is marked with the desired temperature setting for a given point in time throughout the cycle, and an indicator associated with the chart has a cam follower to follow the rises and falls of the outer peripheral cam surface. Thus the cam profile is specially formed or cut in accordance with the temperature setting for each given period of time on the chart, and upon simultaneous advancement of the chart and the program cam the indicator or pointer will provide a continuous indication of the desired set-point temperature for the furnace throughout the heating cycle.

Thermocouples or other suitable temperature sensing devices, one of which is represented at T in FIG. 2, are located in the furnace to sense the temperature at each different zone in the furnace, and the scanner will supervise each zone in succession by measuring the temperature sensed by the thermocouple and calibrating same to provide a visual indication of the temperature control level sensed on the chart. At the same time the temperature sensed is compared with the desired temperature setting, and signal generating means is responsive to the difference between the set-point temperature and temperature sensed to transmit a correction signal to the valve 30 for each zone. Specifically, the correction signal causes the valve 30 to move in the opening direction and to supply more gas through the valve for the purpose of increasing the temperature in the zone.

The temperature established at each zone in the furnace is a function of the volume rate of gas flow, the pressure level of the gas, and of the time period over which the gas is supplied at a given pressure and volume.

Temperature control apparatus of the type described essentially controls the valve opening independently of the gas pressure level. Thus it has been customary practice to establish a fixed pressure level of the gas supply through the main supply line 10, for example, at the pressure regulator 13, the pressure level selected being a maximum value for the highest temperature in the firing cycle. It will be apparent however that in the lower temperature range, correction signals applied to the valve 30 in each zone will cause relatively sudden changes in gas volume; whereas at higher temperatures, the same correction signal applied to the valve 30 in the opening direction will cause relatively slight temperature changes with the same change in volume. Thus in the lower temperature range the tendency will be to bring about rather abrupt increases in heat input and very often in excess of the change in temperature required; and throughout the entire cycle, correction will be made independently of the time rate of change in temperature desired. Stated another way, in the absence of selected changes in pressure, the correction signal applied will reflect only the difference in temperature at a given point in time, not the time rate of change in temperature, making it very difficult to impose either gradual or rapid changes in temperature conditions at the zone when required. These difficulties are overcome in accordance with the present invention in that essentially the gas pressure level is varied in direct relation to set-point temperature variations, and optimum pressure conditions are established throughout the entire firing cycle of the kiln. The result is to realize more uniform, close control over variations in heat input required to most accurately conform to the selected firing cycle or program.

To this end, and as best seen from FIGS. 2 and 3, the pressure regulator 18 is located in the main supply line downstream of the valve 14 and conventionally includes a valve housing 34 between a pressure inlet and outlet in the main supply line. A diaphragm housing 35 depends downwardly from communication with the housing 34, and a spring housing 36 forms a downward, generally cylindrical extension from the underside of the diaphragm housing. A diaphragm within the housing 35 controls movement of a valve member toward and away from a seat in the valve housing 34 to throttle the inlet gas thereby to regulate outlet gas pressure. The position of the diaphragm is suitably controlled by a compression spring 38, shown in FIG. 3, which extends upwardly through the spring housing 36 for attachment to one side of the diaphragm. The spring has a fixed spring constant, and accordingly the position of the diaphragm is determined by the resultant force exerted by the spring against the diaphragm. Increasing pressure exerted on the lower end of the spring will of course increase the compression force of the spring acting against the diaphragm to raise the diaphragm and increase the outlet pressure; conversely, the reduction in compression on the spring acting against the diaphragm will decrease the outlet pressure through the main gas supply line.

In the present invention, the spring force exerted against the diaphragm is programmed in direct correlation with the firing cycle established for the kiln. In the preferred form this is accomplished by a cam element 40 having a specially formed outer peripheral surface 45 and is mounted for rotation by motor drive 42 to regulate the movement of plunger 44 and loading of the regulator spring 38 in direct correlation with variations in the set-point temperature level throughout the firing cycle.

To this end, the cam is fixed for rotation on a bushing 46 at one end of the motor drive shaft 47 of the motor drive 42. The outer peripheral surface 45 of the cam is preformed in accordance with the time-temperature curve selected for the material being heated so that incremental advancement or turning of the cam in either directiion about its axis of rotation will impart linear movement to the plunger and regulator spring to bring about a predetermined increase or decrease in the gas pressure level. For example, the cam surface may be programmed, as illustrated in FIG. 3, for advancement through 180° from an optimum pressure level for the lowest temperature in the firing cycle, represented by the closest point of the cam surface to the axis of rotation, to the maximum temperature in the cycle, as represented by the greatest distance of the cam surface from the axis of rotation. For the purpose of illustration, the point A on the cam may establish optimum pressure level for a minimum temperature of 150° F. and the point B on the cam may establish the optimum pressure level at 2300° F.; and as the cam is rotated from point A to point B the pressure level will increase according to the increasing distance between the cam surface and its axis of rotation.

In the preferred form, the cam is advanced to bring about variations in pressure level in direct relation to variations or changes in the set-point temperature level. This is accomplished by controlling rotation of the motor drive 42 by means of a potentiometer slidewire, represented at 48, which is mounted on the motor drive and is coupled for rotation with the drive shaft 47. The position of slidewire arm 48 is adjusted relative to slidewire 49 by the position of a corresponding slidewire, not shown, for the program controller in the temperature control apparatus. The program controller slidewire is electrically connected to the slidewire 49 and its contact terminals by leads 50, and in turn the slidewire arm 48 is electrically connected to control actuation of the motor drive. In a well-known manner, when the program controller slidewire arm is adjusted along its slidewire, in accordance with increases or decreases in the set-point temperature level, the voltage developed is not in balance with that of the slidewire 49. Accordingly, the motor drive 42 is energized by the voltage imbalance to advance the slidewire arm 48 to a position in voltage-balanced relation to the program controller slidewire; and the cam member 40 is turned by the motor drive shaft in a corresponding direction and over a distance to modify the gas pressure and establish optimum pressure conditions for the new temperature setting. Thus, the cam profile or surface 45 is formed to program the pressure level in direct relation to changes in the set-point temperature.

The motor drive is assembled and mounted in a housing 54 attached to the lower end of the spring housing 36 by a threaded male connector 55 secured to the top surface of the motor drive housing 48. The connector includes a central bore 56 for upward passage of plunger rod 44 therethrough; and the upper end of the plunger rod includes an abutment 58 bearing against the lower end of the spring 38. The lower end of the plunger rod has a generally U-shaped yoke 60 mounted on a bolt member 62, the latter being supported for up and down slidable travel through elongated slots 63 in spaced-apart bracket members 64. In order to impart linear travel to the plunger, a bearing 66 is journaled on the bolt 62 in aligned relation to the cam surface 45 so that the bearing is free to follow the rise or fall of the cam surface and impart such movement to the plunger.

In use, the cam 40 will have its surface preformed in accordance with the time temperature curve selected for the material being heated. Similarly, the pressure regulator is calibrated so that, in following the movement of the cam, optimum pressure levels will be established in the main gas supply line for the set-point temperatures and temperature changes required throughout the firing cycle. The temperature control apparatus will successively scan and sense the temperature at each zone to compare the temperature sensed with the set-point temperature level, and when necessary a correction signal is transmitted to open the valve 30 and increase the volume of gas supplied to each zone. At the same time, the pressure level of the gas is modulated in accordance with variations imposed by the cam 40 independently of variations in the volume rate of flow imposed by correction signals to each valve, since the cam control will follow changes in the set-point temperature level and effect the desired change in gas pressure independently of the temperature control apparatus.

Theoretically, it would be possible to control temperature variations in the furnace solely by the cam-controlled pressure regulator and eliminate separate means of control, such as, the temperature-controlled valves 30. In practice, however, heat losses, nonlinear variations in flow through the valves 30 and other practical considerations dictate the necessity of some means of control in direct response to actual temperature conditions in the furnace.

It will be evident that the pressure may be regulated by means other than the use of a cam programmer to effect the necessary changes in pressure level and in heat input to the furnace. Nevertheless it has been found that the programming device as described represents a positive and reliable means of regulating the gas pressure in direct response to changes in the set-point temperature level.

It is therefore to be understood from the foregoing that various modifications and changes may be made in the procedure followed as well as in the construction and arrangement of parts in the preferred form of the present invention without departing from the spirit and scope thereof as defined by the appended claims.

What is claimed is:

1. In a gas-fired furnace having a source of gas supply to at least one heating element for the furnace, pressure regulating means for the gas supply, and temperature control apparatus including means providing a selectively variable set-point temperature signal representative of the desired temperature level of the furnace, the combination therewith of selectively variable pressure control means operatively connected to said pressure regulating means to modulate the outlet pressure of the gas delivered to said heating element, said pressure control means being interposed between said temperature control apparatus and said pressure regulating means to cause predetermined variations in gas pressure to said heating element in direct correlation with changes in the set-point temperature signals, said pressure regulating means including a valve control element being selectively movable under the control of said programming device to regulate the outlet pressure to said heating element, and said programming device defined by a motion-transmitting element drivingly connected to said valve control member to impart linear movement to said valve control member in a direction and over a distance causing selected variations in outlet pressure, and motor drive means for driving said motion-transmitting element at a predetermined rate of speed.

2. In a gas-fired furnace according to claim 1, said valve control member being in the form of a spring-loaded plunger element including a bearing member journalled at one end thereof, and said pressure control means including a rotatable cam member provided with an outer peripheral surface engaged by said bearing member, the peripheral surface of said cam being formed to impart linear movement to said plunger element to effect predetermined changes in outlet gas pressure to said heating element upon rotation of said cam at a predetermined rate of speed.

3. In a gas-fired furnace according to claim 3, said pressure regulating means being further characterized by including a cylindrical housing in outer concentric relation to said plunger element with diametrically opposed, longitudinally extending slots in said housing, and the end of said plunger element including a yoke supporting said bearing member in journaled relation to said plunger element and having guide pins projecting outwardly through said slot to guide said plunger element for movement in a linear direction through said housing to rotation of said cam.

4. In a multizone furnace having heating elements stationed at different selected zones of the furnace and a common source of gas supply for the heating elements including pressure regulating means associated with the gas supply source, the combination therewith of temperature control apparatus including means providing selectively variable set-point temperature signals representative of the desired temperature level of the furnace at selected time intervals in the firing cycle, means for modulating the volume rate of gas supplied to a heating element for each zone and adjustable gas pressure control means operatively coupled to said pressure regulating means and being programmed to establish predetermined variations in gas pressure in direct correlation with temperature changes of said first means and independently of variations in the volume rate of gas flow.

5. In a multizone furnace according to claim 4 wherein said pressure regulating means includes a plunger element being movable to regulate the outlet pressure in said gas supply means, and said second pressure control means being defined by a rotatable cam provided with an outer peripheral surface being formed to circumscribe variations in distance from the axis of rotation of said cam in relation to changes in the set-point temperature level, drive means for rotating said cam at a predetermined rate of speed, and a cam follower connected to said plunger element and being movable in response to variations in the surface configuration of said cam to advance said plunger element in a linear direction whereby to vary the outlet pressure in direct relation to changes in the set-point temperature level.

6. In a multizone furnace according to claim 7, said drive means being reversible and including a drive control member being responsive to increases and decreases in the set-point temperature level to energize said drive means for rotation of said cam in a direction and over a distance to effect a change in pressure proportioned to the variation in set-point temperature.

7. In a gas-fired furnace having a source of gas supply to at least one heating element for the furnace, pressure regulating means for the gas supply, and temperature control apparatus including means providing a selectively variable set-point temperature signal representative of the desired temperature level of the furnace, the combination therewith of means for modulating the volume rate of gas supplied to the heating element, selectively adjustable pressure control means operatively connected to said pressure regulating means to modulate the outlet pressure of the gas delivered to said heating element, said pressure control means being interposed between said temperature control apparatus and said pressure regulating means to cause predetermined variations in gas pressure to said heating element in direct correlation with changes in the set-point temperature signals and independently of variations in the volume rate of gas flow.

References Cited

UNITED STATES PATENTS

| | | | |
|---|---|---|---|
| 1,180,638 | 4/1916 | Fabian | 236—15 |
| 1,868,801 | 7/1932 | Munz | 137—624.17 |
| 2,292,937 | 8/1942 | Harrison | 236—78 |
| 2,376,573 | 5/1945 | Cockley | 236—46 |
| 2,632,599 | 3/1953 | Hornfeck | 236—15 |
| 3,274,375 | 9/1966 | Beltz | 236—46 |
| 3,319,887 | 5/1967 | Gallagher | 236—15 |

WILLIAM E. WAYNER, Primary Examiner

U.S. Cl. X.R.

137—624.11; 236—46; 431—18.